United States Patent [19]

Iverson

[11] 3,899,404

[45] Aug. 12, 1975

[54] METHOD OF REMOVING MERCURY FROM AN AQUEOUS SOLUTION

[75] Inventor: Marlowe L. Iverson, Simi, Calif.

[73] Assignee: Rockwell International Corporation, El Segundo, Calif.

[22] Filed: June 7, 1974

[21] Appl. No.: 477,530

Related U.S. Application Data

[63] Continuation-in-part of Ser. No. 240,058, March 31, 1972, abandoned.

[52] U.S. Cl. .................. 204/146; 204/1 R; 204/124; 204/130; 204/149
[51] Int. Cl.[2] .... B01K 3/00; B01K 3/04; C02B 1/82
[58] Field of Search ........... 204/130, 131, 149, 152, 204/124, 1 R, 146

[56] References Cited
UNITED STATES PATENTS

| 3,457,152 | 7/1969 | Maloney, Jr. et al. ............... 204/131 |
|---|---|---|
| 3,716,459 | 2/1973 | Salter et al. ........................ 204/1 R |
| 3,755,114 | 8/1973 | Tarjanyi et al. .................. 204/149 X |

Primary Examiner—John H. Mack
Assistant Examiner—A. C. Prescott
Attorney, Agent, or Firm—L. L. Humphries; C. E. DeLarvin; H. Kolin

[57] ABSTRACT

A method of removing mercury from an aqueous solution containing the same, such as a waste water, including the steps of passing the solution through a bed of zinc or zinc-coated particles, amalgamating the mercury in the solution and the zinc metal of the particles by plating the mercury on the zinc in an electrochemical cell, and preferably then separating the mercury from the zinc or zinc-coated particles.

11 Claims, 3 Drawing Figures

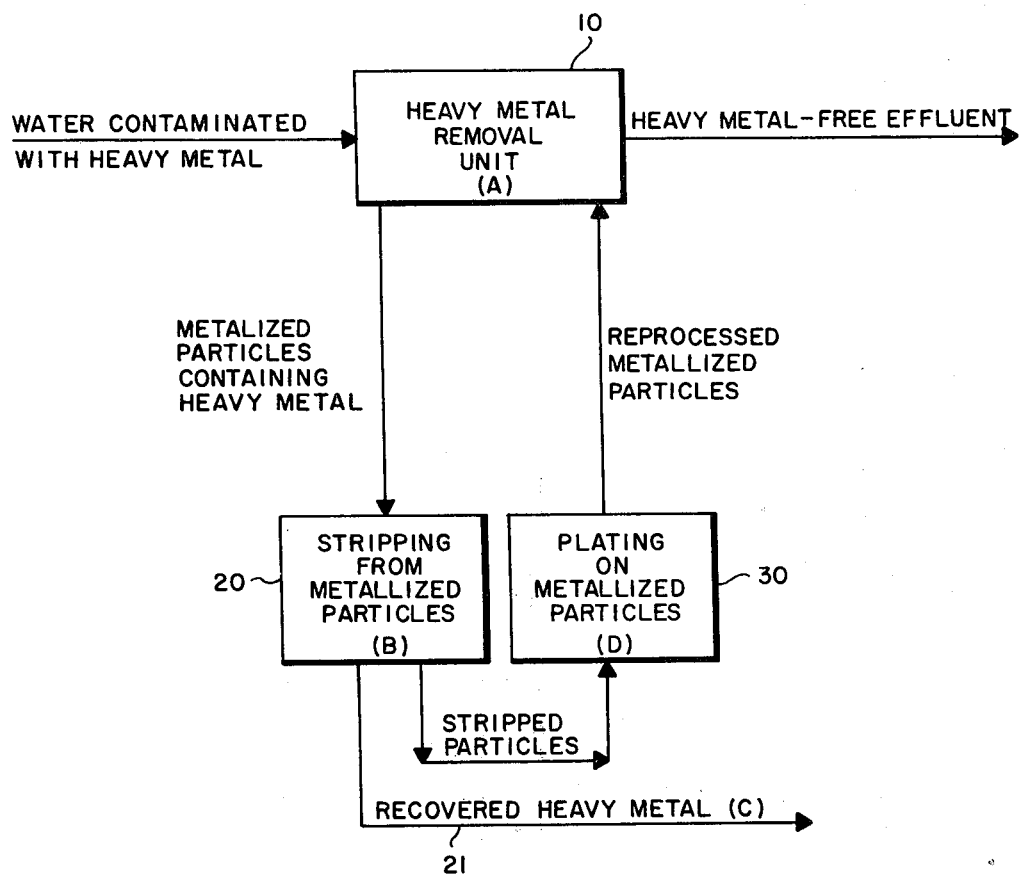
FIG. 1
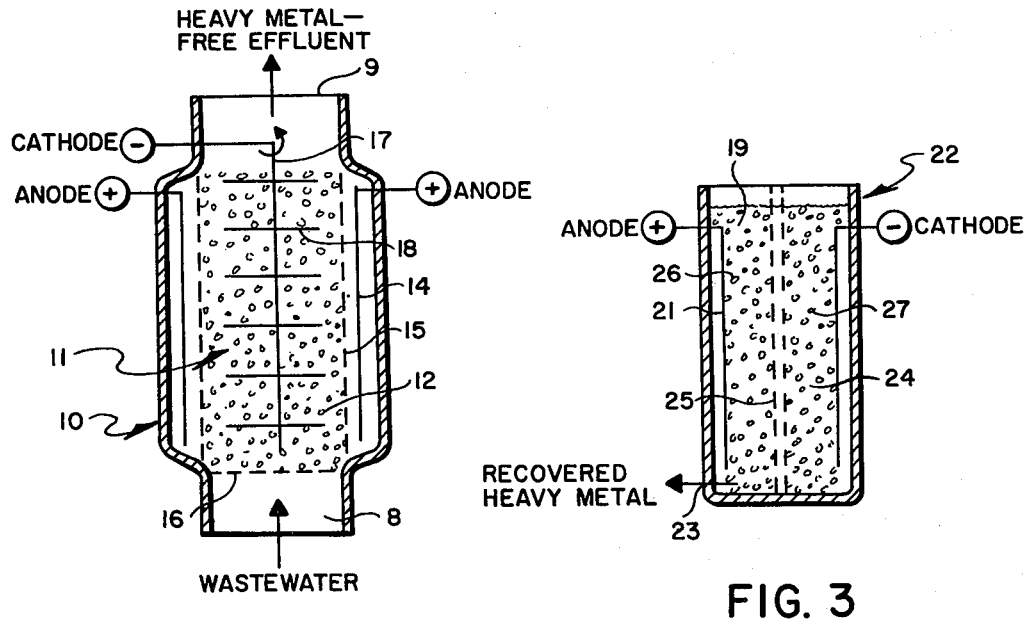
FIG. 2
FIG. 3

METHOD OF REMOVING MERCURY FROM AN AQUEOUS SOLUTION

CROSS REFERENCE TO RELATED APPLICATIONS

This application is a continuation-in-part of Application Ser. No. 240,058 filed Mar. 31, 1972 and assigned to the Assignee of the present application.

It is noted that Application Ser. No. (477,531), filed of even date herewith, is also a continuation-in-part of application Ser. No. 240,058 filed Mar. 31, 1972 now abandoned and assigned to the Assignee of the present application.

BACKGROUND OF THE INVENTION

1. Field of the Invention

This invention is directed to the electrochemical removal of mercury from waste waters. It is particularly directed to a mercury-removal and regeneration method suitable for recovery of the removed mercury.

There is considerable and growing concern over contamination of the nation's waterways with mercury and other heavy metals. Mercury is known to be a neuropoison, being especially dangerous in the alkyl mercury form often found in water and aquatic life. Cadmium in river water has been identified as the cause of a painful disease (itai itai). Lead and other heavy metals are suspected to being dangerous pollutants in our waters.

Many of these heavy metals enter our waters from industrial sources, such as metal finishing plants and from mining sources. Recent steps to limit the pollution from these sources, e.g., in the case of mercury from chloralkali plants, have been relatively effective. However, some reduced but significant quantities of these heavy metals will continue to come from industries and mines unless treatment specifically directed toward heavy-metal removal is given.

Heavy-metal contamination may also arise from "natural" sources, e.g., mercury at levels to cause concern has been found in lakes where little, if any, human activity has occurred. To clean up these waters, the only course open is to treat specifically to remove the heavy-metal contaminants.

2. Prior Art

Various methods are reported to be available and in use for removal of different heavy metals from water. The methods currently commercially available for metal removal, e.g., chemical precipitation, reverse osmosis, ion exchange, and absorption, are generally costly, require elaborate equipment, are specific for only a few metals, or present serious waste disposal problems. In addition, they are, in general, not able to attain the very low effluent metal levels contemplated in prospective future governmental regulations dealing with water contamination. Thus, certain of these methods merely substitute one undesirable metal ion in place of the metal ion being removed. For mercury, chemical treatment (e.g., with $FeCl_2$ of $Na_2S$) to form elemental mercury or an insoluble mercury compound has been used. A process involving ion exchange as one of its many steps is claimed to be effective. U.S. Pat. Nos. 3,083,079 and 3,085,859 show specific mercury removal processes. However, with low mercury concentration, the chemical methods require a large quantity of inert carrier solids for efficient separation. This in turn requires the handling and disposal of large volumes of precipitate in order to remove the mercury. The ion-exchange process generates a mercuryloaded resin which cannot be regenerated and must be disposed of. For other heavy metals, either the situation is similar or no satisfactory treatment method exists. Early use of zinc particles as a filtering medium for separating metals and purifying water is seen in U.S. Pat. Nos. 418,138 and 634,462. U.S. Pat. Nos. 1,743,525 and 1,789,425 use a filter medium of metallic filaments, mentioning zinc but no chemical action or release of zinc ions to the solution are mentioned. Karpiuk et al (U.S. Pat. Nos. 3,029,143 and 3,029,144) make use of sodium amalgam to remove mercury from solutions using steel or nonmetallic beds. Amalgam and mercury metal accumulate below the bed where it is removed for further treatment. Town (U.S. Pat. No. 3,361,559) shows a process of precipitating elemental mercury from an aqueous solution of sodium sulfide-sodium hydroxide containing mercury by the addition of elemental antimony to the solution. U.S. Pat. Nos. 3,039,865 and 3,704,875 show additional processes of recovering mercury from aqueous solutions.

U.S. Pat. No. 3,457,152 shows an electrolytic process for removing trace quantities of metals from an aqueous solution, particularly applicable for electrohydrodymerization reactions. The electrolytic apparatus utilizes a cathode comprising a body of lead shot, other metals possessing similar hydrogen overvoltage such as zinc or cadmium being mentioned as alternative cathode materials. In U.S. Pat. No. 3,728,238 is shown a process for decreasing the hexavalent chromium content of a liquid by having a bed of dispersed particles in the electrolyte. In U.S. Pat. No. 3,791,520 water contaminated with hexavalent chromium is contacted with a water insoluble lead compound adsorbed in the pores of a particulate matrix. In U.S. Pat. No. 3,764,499 a process is shown for removal of contaminants from waste waters by utilizing a membrane partitioned electrolytic cell in which the electrolytic chambers are filled with various granular fibers or segmented electric conductors.

SUMMARY OF THE INVENTION

The present mercury removal method uses zinc or zinc-coated particles in a stationary or fluidized (or otherwise agitated) bed electrochemical cell together with a direct electric current. The mercury is deposited on and amalgamated with the metallized particles which may be considered part of the cathode in the cell. After a desired deposit of mercury is built up as an amalgam or coating with or on the zinc on the particles, advantageously the amalgamated or coated particles are transferred from the cell and preferably regenerated, using either an electrochemical or chemical technique.

DESCRIPTION OF THE DRAWINGS

FIG. 1 is a process flow diagram;

FIG. 2 is a cross-sectional schematic view of a typical mercury removal unit; and FIG. 3 is a cross-sectional schematic view of a regeneration and mercury recovery unit.

DETAILED DESCRIPTION

A flow diagram for the system using the novel mercury removal method is shown in FIG. 1. The method involves four main steps: (A) the collection of mercury from water in mercury removal electrochemical unit 10 containing zinc-coated collector particles involving the deposition of metallic mercury and amalgamation of the mercury with the zinc; (B) electrolytic stripping of the zinc-mercury amalgam from the collector particles by stripping unit 20; (C) removal of mercury from the stripping unit by line 21; and (D) electroplating zinc back onto the collector particles in a plating cell 30 and returning the zinc-plated collector particles back to the removal unit 10. In the removal unit an electrical potential is applied between the zinc-plated collector particles and an anode so that (a) electrochemical rather than chemical deposition of Hg takes place and (b) less easily reduced forms of combined mercury may be deposited. Operations (B) and (D) may be carried out in a single cell.

The removal process of Step A collects the mercury on the zinc-plated particles by amalgamation. For use in a fluidized bed electrochemical unit (FIG. 2), the particles preferably should be of essentially uniform size and density to allow the collector particles to be conveniently and repeatedly reprocessed in the steps described. Agitation of the collector particles in the fluidized bed is provided by action of the incoming waste water or by rotation of the cathode (FIG. 2). Agitation will provide effective transport of the mercury or other heavy-metal contaminants to the collector surface, allow suspended solids to move through the bed, prevent clogging or buildup of sludge in the bed, provide a burnishing action to densify the zinc coating on the particles, thereby maintaining a reactive and adhering surface, and maintain a uniform distribution of mercury over the entire bed.

For optimum operation, round lightweight balls are preferred for use as the collector particles. Zinc-coated nonmetallic substrates such as solid or hollow glass or plastic beads serve this purpose. A primary metal layer such as silver, nickel, or copper is deposited by electroless plating or other means to impart electrical conductivity to the nonmetallic substrates. Copper or nickel is preferred as the base or primary metal layer for reasons of cost.

The zinc coating may be applied to balls of metal, glass, or plastic by suitable known treatments. Use of plastic balls instead of glass yields a lower overall density and permits lower flow rates to achieve a given degree of fluidization. Small balls of either type would do likewise. A cylindrical cell is practical and effective. Some taper in the cylinder may improve uniformity of fluidization. Uniformity may also be improved by tangential entrance of the water, flow baffles, or use of air jets.

A suitable electroless process is seen in U.S. Pat. Nos. 2,532,283 and 2,532,284. The zinc coating then is applied by conventional electroplating, such as by deposition in a conventional cyanide plating bath.

The selection of zinc for mercury removal is based on the following: (1) it has a high diffusion rate in mercury (diffusion coefficient = $8172 \times 10^{-2}$ cm$^2$/hr at 15°C) thereby insuring that the surface concentration of mercury will always be low; (2) zinc has favorable electrochemical properties for reprocessing; specifically, it forms an amalgam with mercury and can then be easily separated from the mercury and recycled; (3) zinc is considered to have low toxicity as an impurity in water, thus any small loss of zinc to the treated water will be relatively innocuous; and (4) it is a low cost metal.

The water to be treated must have some dissolved salt content for electrolytic conductivity so that the electrolytic cell process may occur. This salt will normally be present in the effluent being processed but, if needed, addition of a small amount of an electrolyte, e.g., NaCl, to mercury-containing water may be made to enable it to be treated without serious effect on subsequent use of the water. Strongly acid or strongly basic waters should preferably be adjusted to a more nearly neutral pH before treatment. This will not seriously affect the applicability of the method in that contaminated water of pH value suitable for legal discharge is suitable for treatment by this method. The conductivity of the solution should be at least that of a solution containing 100–200 ppm of dissolved salts (NaCl). A conductivity equivalent to that of a solution containing 200 ppm to 3.5% salt (NaCl) content is a preferred range.

The method is applicable to various forms of mercury, for example, elemental and soluble and insoluble inorganic compounds and organic compounds, including methyl mercury. Substantial amounts of compounds of other metals such as Pb, Au, Ag, Cd, Cu, and Zn also are removed. Other metal compounds such as As, Sb, Sn, Bi and Ni also are removable from chloride solutions.

The operating parameters (size of cell, current, size of balls) for optimum removal will differ for the particular form of the particular heavy metal. Waters from a few parts per billion (ppb) to over 100 ppm of a heavy-metal impurity may be treated. It should be noted, though, that a given quantity of metal may be removed more easily and economically the more concentrated it is.

FIG. 2 shows a schematic of a metal removal unit 10, usable to perform step A. The water (waste water) containing mercury as a contaminant passes upward through inlet 8 and through a fluidized bed 11 of zinc-coated balls 12, which bed acts as the cathode in the electrolytic cell. A potential is applied to the balls by their contact, as they move about, with each other and with a cathodically polarized screen or plate 13. The mercury is deposited by amalgamation with the zinc coating the balls 12. The water leaves the cell 10 as an effluent essentially free of mercury through outlet 9. An anode 14 is provided which is kept separated from and out of contact with the balls 12 by a porous separator 15. The separator normally comprises a perforated cylinder having a perforated bottom 16 which aids in holding the balls 12. At the anode 14, evolution of a small amount of oxygen or chlorine or a mixture of these occurs simultaneously with the mercury removal process. The cathode comprises a central collector rod 17 having rods 18 spaced in a vertical plane along its length, the rods preferably being made of zinc-plated steel. The anode 14 is a right circular cylinder made of a Monel screen in a carbon structure. Suitable terminals are provided on each of the anode and cathode and connected to a direct current source (not shown). The voltage across the cell is in the preferred range of from about 2 to 12 volts. The flow rate of the waste water through electrochemical unit 10 is dependent on amount of mercury removal desired, dwell times, and fluid velocity, and may range from small units processing 1 to 25 gpm up to large units handling from 1000 to 5000 gpm or larger.

Upon the application of a potential to the collector or balls 12, mercury cations are deposited by the reaction:

$$Hg^{+2} + 2e^- \rightarrow Hg.$$

A similar reduction process is believed to occur for other mercury compounds. With metallic mercury, the reaction is one of amalgamation:

$$Hg + Zn = Zn(Hg) \text{ amalgam}.$$

Zinc is not released in these reactions and does not enter the water as a contaminant.

The application of a voltage potential substantially reduces any corrosion of the zinc. Zinc is thermodynamically unstable in the presence of water and aqueous solutions and tends to dissolve with the evolution of hydrogen. This reaction takes place very slowly when zinc is pure, due to the large hydrogen overpotential of zinc. However, the reaction is more rapid if zinc is put in contact with a metal of low hydrogen overpotential, such as platinum. In cases where the water being treated contains metal impurities other than mercury, other metals may be collected on the zinc surface. Although none of these will have hydrogen overpotentials as low as platinum, the hydrogen overpotentials of iron, copper, and nickel, for example, are small enough to increase the corrosion rate of zinc. Preliminary values for the corrosion rate of 0.6 mm diameter zinc particles which had collected Hg, Cd, and As were found to be about 20 $\mu/cm^2$ at pH 6.5. This corresponds to <1% of the rate of heavy-metal pickup by the particles in a bed. Raising the pH to 7.5 will cut this corrosion rate by about an order of magnitude. Imposition of a cathodic potential further reduces the rate of corrosion.

A chemical mode of action also may occur as follows. Mercury is displaced from many of its compounds by metals which are above it in the electromotive force series. Thus, for example, mercury in an oxidized state may be displaced by these metals, zinc, for example, according to the reaction:

$$Hg^{++} + Zn \rightarrow Zn^{++} + Hg.$$

This reaction takes place under a wide variety of conditions including variations in pH and the presence of other cations and anions at high concentrations. The reaction causes the zinc to go into solution as a cation, leaving a deposit of mercury which amalgamates with the unreacted metal, since mercury amalgamates with almost all metals (a notable exception is iron).

While zinc working along (i.e., without applied potential) will remove mercury and its compounds (see U.S. Pat. No. 3,039,865), the electrochemical process offers several clear advantages. The application of a negative potential to the zinc collector particles will speed up sluggish reactions and promote the deposition of mercury from relatively stable mercury compounds, thus making the method useful for an even wider range of conditions. The method also is useful for other metals less noble than mercury. In accordance with the present electrochemical process, substantially no zinc is released to the water. It has been found, however, that when the aqueous solutions do not contain mercury that small amounts of zinc are released to the water. It is believed that the formation of the zinc-mercury amalgam in some way prevents or substantially reduces the release of zinc ions to the water.

Steps B, C, and D may be carried out together as shown in FIG. 3. The mercury-loaded, zinc-coated balls 26 containing the amalgamated materials are fed into the anode compartment 21 of a fluidized or rotating particle bed cell 22. Here, the zinc is stripped off, zinc ions thereby going into solution in the electrolyte 19. Mercury is left behind as the zinc is stripped away from the collector particles. The mercury will be in the form of droplets which will coalesce and fall to the bottom of the container. The mercury can then be removed through outlet 23 and recovered for use. When fully stripped, the balls 27 are transferred to the cell cathode compartment 24 where they are zinc plated. The plated balls are then recycled to the removal unit shown in FIG. 2. Cell 22 contains a separator 25 which divides the compartmented cell. The separator is porous, allowing access of the zinc-ion-containing electrolyte, such as $ZnO_2^{--}$ in a KOH solution, from the anode side to the cathode side of the cell. The rotating particle bed cell may comprise that shown in U.S. patent application Ser. No. 16,203 filed Mar. 3, 1970, now U.S. Pat. No. 3,663,298.

With a bed designed for intermittent or constant fluidization, waste waters with suspended solids are amenable to treatment. For example, raw sewage generally contains a large amount of suspended solids and would be likely to foul the system. It now is feasible to treat such sewage for mercury removal. This would prevent the mercury contaminant from interferring with biological (secondary) treatment. A constant or intermittent agitation of the fluidized bed will tend to minimize any fouling due to organic growth on the particles and other cell components. Slurries consisting, for example, of mud drawn from benthic layers in lakes and streams may be treated. Thus, mercury or other heavy metals which have accumulated in lakes and estuaries may be removed using this method.

EXAMPLE 1

Test aqueous solutions containing heavy-metal compounds were passed downward through columns packed with granular zinc. A potential was applied between the bed (cathode) and a stainless steel screen (anode), separated from the bed by a porous separator causing a flow of direct current therebetween. The results are summarized in Table I.

TABLE I

COLUMN REMOVAL OF HEAVY METALS WITH DC POTENTIAL APPLIED

| Metal | Form: Aqueous Solution of | Column Size | Applied Potential (volts) | Residence Time (min) | Input Conc. (ppm) | Discharge Conc. (ppm) | Percent Removal |
|---|---|---|---|---|---|---|---|
| Cd | $Cd(NO_3)_2$ | 2.2 cm dia × 22 cm high | ~6 | ~1 | 100 | ~2 | 98 |
| Cu | $CuSO_4$ | 2.2 cm dia × 22 cm high | ~6 | ~1 | 10 | ~2 | ~80 |

Analysis of the effluent aqueous solutions discloses the presence of a small amount of zinc.

EXAMPLE 2

Tests were run with dilute solutions of sodium ethylmercurithiosalicylate (merthiolate) in water. Mixing the solution with 30-mesh zinc for one hour produced a lightening in color of the solution, indicating a reaction was occurring. A similar test was carried out where a 2-volt DC potential was applied between the zinc and a platinum anode. The solution was lightened significantly more in the test with applied potential. A similar test in which the mercury compound, in a water solution with NaCl, deposited in a shiny film on a copper strip in 15–20 minutes with a potential of 2–3 volts applied, was also completed. Tests were conducted using $HgCl_2$ (~100 ppm) dissolved in $H_2O$ with 8-hydroxyquinoline and NaOH base added, with an electrical potential of 2–3 volts passed to zinc and copper electrodes. Shiny deposits were apparent on the electrode substrates. Without a charge on the copper strip no shiny surface appeared. The solutions from this example were analyzed after treatment and substantially no zinc ions were found.

EXAMPLE 3

A laboratory scale system comprising a feed tank, pump, flowmeter, and from one to five fluidized bed electrochemical cells was constructed. The cells contained a carbon rod anode, plastic screen separator, and cathode particles made of zinc-plated, silvered, glass spheres. Copper ion in a 3.5% NaCl brine was pumped through each cell in sequence. A DC potential was applied across the carbon rod and the cathode particles (using a screen cathode collector). The results obtained are summarized in Table II.

TABLE II

| Test No. | No. of Cells | Applied Voltage (v) | COPPER REMOVAL DATA Residence Time (sec) | Initial Copper Conc. (ppm) | Avg. Final Copper Conc. (ppm) | Percent Removal |
|---|---|---|---|---|---|---|
| 1 | 1 | 6 | ~6 | 0.375 | 0.260 | 31 |
| 2 | 4 | 12 | ~24 | 0.220 | 0.067 | 70 |
| 3 | 4 | 12 | ~24 | 0.560 | 0.125 | 78 |
| 4 | 4 | 12.5 | ~24 | 0.120 | 0.028 | 77 |

An analysis of the effluent solutions also discloses that a small amount of zinc has gone into solution.

The foregoing examples and description are for the purpose of illustration only and should not be construed as limiting the scope of the invention; reference being had to the appended claims for such latter purpose.

I claim:

1. A method of removing mercury from an aqueous solution containing the same comprising:
    passing an electrically conductive aqueous solution containing mercury through an electrochemical cell containing an anode and a cathode comprising a bed of particles having zinc surfaces,
    contacting said particles with a cathodically polarized collector,
    passing a direct current from said anode through said solution to said particles whereby the mercury is deposited upon and amalgamated with the zinc surfaces of said particles, and
    discharging said solution of reduced mercury content.

2. The method of claim 1 wherein said particles are particulate zinc.

3. The method of claim 1 wherein said particles are zinc-coated nonmetallic substrates.

4. The method of claim 1 wherein an applied voltage of from about 2 to 12 volts is maintained between said anode and said particles.

5. The method of claim 1 wherein said bed is intermittently fluidized.

6. The method of claim 1 wherein the mercury is recovered from said particles.

7. A method of removing mercury from an aqueous solution containing the same comprising passing an electrically conductive aqueous solution containing mercury through an electrochemical cell containing an anode and a cathode comprising a bed of particles having zinc surfaces,
    contacting said particles with a cathodically polarized collector,
    passing a direct current from said anode through said solution to said particles whereby the mercury is deposited upon and amalgamated with the zinc surfaces of said particles, discharging said solution of reduced mercury content, and
    recovering said mercury by electrolytically stripping the zinc from the amalgam whereby the mercury forms droplets which coalesce and are recovered.

8. The method of claim 7 wherein said particles are particulate zinc.

9. The method of claim 7 wherein said particles are zinc-coated nonmetallic substrates.

10. The method of claim 7 wherein an applied voltage of from about 2 to 12 volts is maintained between said anode and said particles.

11. The method of claim 7 wherein said bed is intermittently fluidized.

* * * * *

UNITED STATES PATENT AND TRADEMARK OFFICE
CERTIFICATE OF CORRECTION

PATENT NO. : 3,899,404

DATED : August 12, 1975

INVENTOR(S) : Marlowe L. Iverson

It is certified that error appears in the above-identified patent and that said Letters Patent are hereby corrected as shown below:

On the front page under References Cited [56], "Tarjanyl et al" should read --Tarjani et al--.

Column 2, line 2, "mercuryloaded" should read --mercury-loaded--.

Column 7, line 31, "catbon" should read --carbon--.

Signed and Sealed this

Thirty-first Day of August 1976

[SEAL]

Attest:

RUTH C. MASON
*Attesting Officer*

C. MARSHALL DANN
*Commissioner of Patents and Trademarks*